Jan. 23, 1940.  G. STEINGRUBER  2,188,122

ELECTRIC SPACE HEATER

Filed Jan. 10, 1939  3 Sheets-Sheet 1

Inventor
G. Steingruber
By Robb & Robb
Attorneys

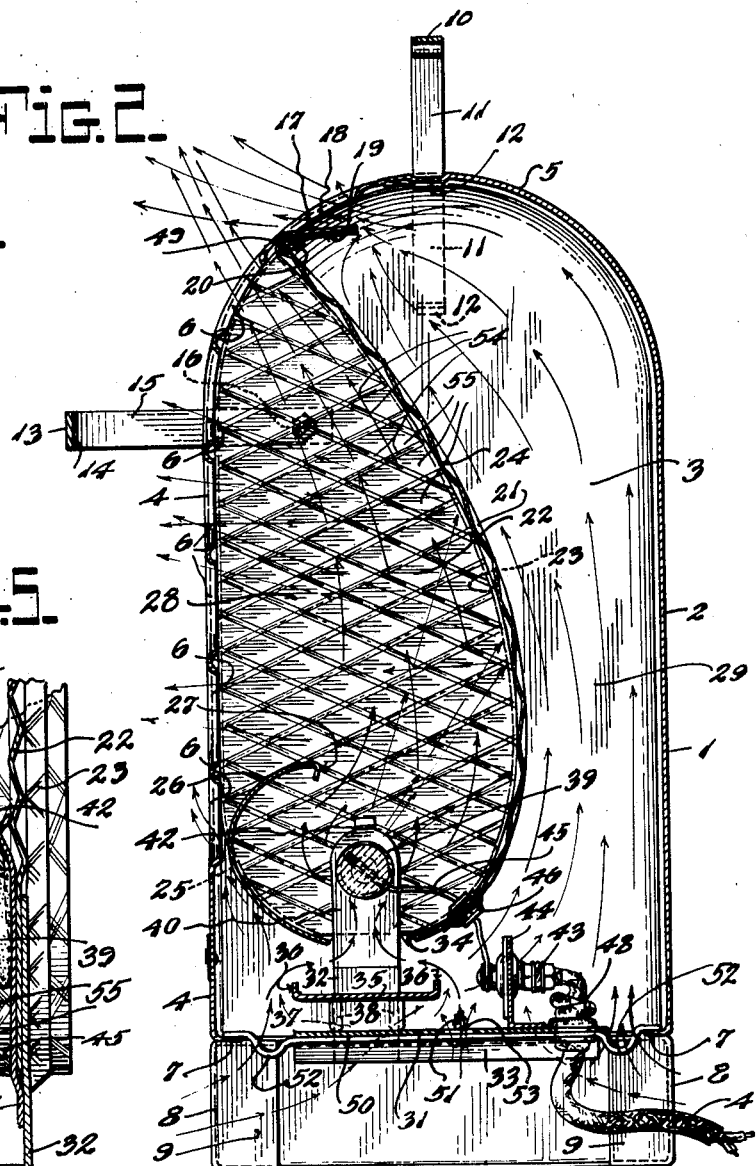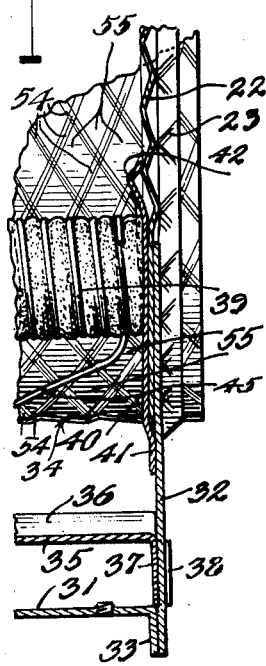

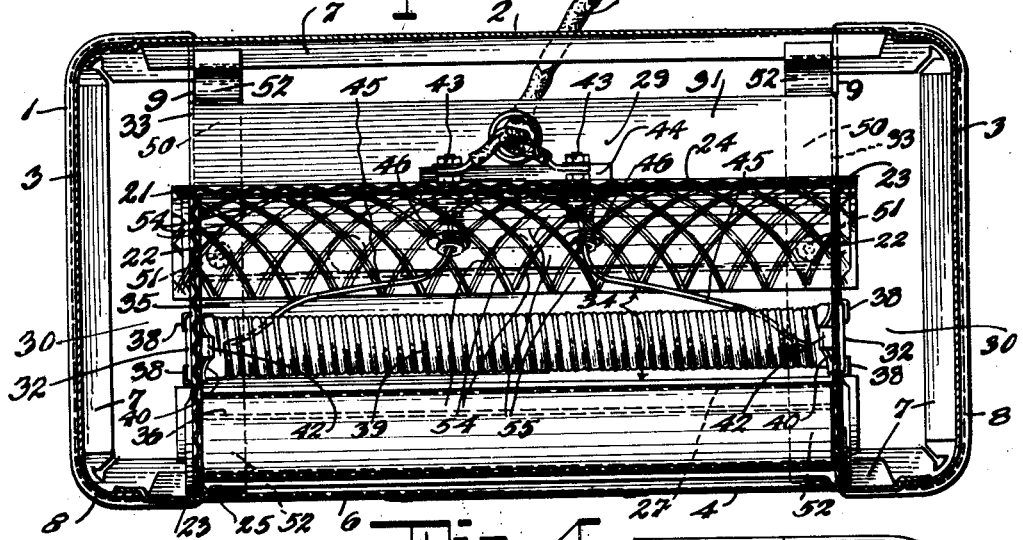
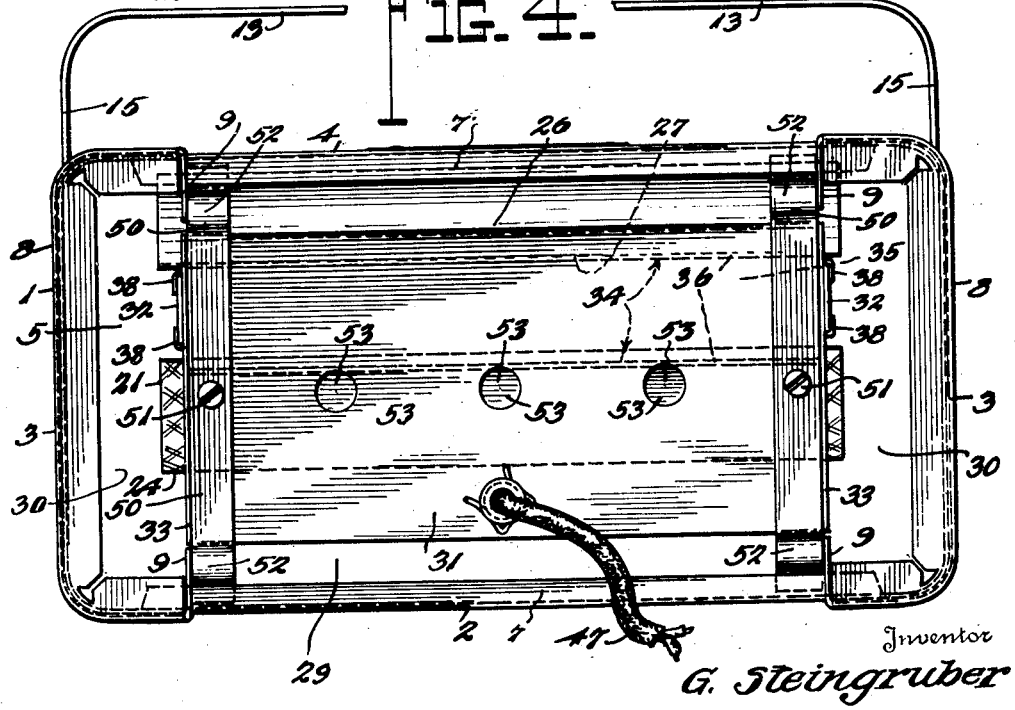

Patented Jan. 23, 1940

2,188,122

UNITED STATES PATENT OFFICE 2,188,122

ELECTRIC SPACE HEATER

George Steingruber, Shelbyville, Tenn.

Application January 10, 1939, Serial No. 250,202

5 Claims. (Cl. 219—34)

This invention relates to electric heaters, and more especially, to an improved heater construction utilizing the combination of reflected, radiated, and circulated heat, whereby a greatly increased efficiency in heating action is obtained over that of prior heaters.

Due to the novel features of my heater, I am able to obtain a marked increase in economy of operation, while producing a flow of clean, warm air in sufficient quantity to virtually flood a room of considerable size, the heat being diffused in all directions and thereby avoiding one of the principal drawbacks of heaters heretofore available and which are characterized by the concentration of heat relatively close to the heater. This concentration of heat in the case of prior heater constructions is generally known as "spot" heating, and while I am aware that it has previously been proposed to utilize forced circulation of air in heaters of this type, as by relying upon either convection or power driven fans, the former heaters have still not been successful because of the fact that the circulation is not effected to best advantage or at its maximum efficiency.

My new heater may be made either in the form of a portable unit which may be conveniently moved about from place to place or from one room to another, or it may be permanently installed in or upon a wall of a room where it is out of the way and substantially concealed much on the order of certain types of radiators which are in use for household heating purposes. By reason of the especially high economy of my heater, it is practically adapted for use for household heating purposes without any aid from an additional heating system, in which case, one or more heating units may be installed in each room, according to the capacity of each heater and the size of the room. This is especially practical in certain sections of the country where low cost electrical power is available, and even where the cost of electrical power is considerably higher but the climate is temperate. Of course, my heater can also be used to great advantage as an auxiliary to an existing or main heating system.

One of the primary objects of my invention is to provide an electric heater which includes a heating element, wherein air is circulated with a maximum natural draft effect directly over the heating element.

A further object of the invention is to provide an improved heat reflector which is so constructed as to produce a more efficient reflection and diffusion of the heat than has heretofore been attained.

Another object of the invention is to provide a heater of the aforementioned type, wherein air is circulated at maximum efficiency, preferably by natural draft, over the exterior of the heat reflector and diffusing means, as well as over the interior of the same.

Still another object of the invention is to provide a heat reflector and heating element assembly of unitary construction which is assembled in and is capable of being removed from an outer shell or casing without requiring the manipulation of a multiplicity of screws or other fastening devices.

In carrying out the aim of the invention referred to in the preceding paragraph, the reflector unit is so spaced in relation to the outer casing and secured thereto as to provide a substantial air space between the same for the passage of air to entrain a considerable volume of heat which is discharged at the upper end of the heater following entrance of cool air at the bottom of the heater into the air space. Such construction as just referred to contributes to the safety of operation of the heater and minimization of fire hazard in that the exterior surface of the heater is maintained comparatively cool.

The invention further contemplates a novel mounting for electric heating elements of the type which include a burnt clay or refractory support, which mounting serves to cushion the support and reduce the likelihood of breakage which so frequently occurs in other heaters due to accidental dropping or tipping over of the heaters. My new yieldable mounting is especially advantageous as a guard against damage of the heating element in handling of the heaters during shipment and by shocks imposed thereon while in transit.

Still another object of the invention is to provide an improved heater which is largely constructed of sheet metal and is therefore comparatively light in weight, and the parts of which may be secured together by welding to reduce the time and labor of assembly, while at the same time affording a rugged and neat appearing device.

Other and further objects and advantages of the invention will be hereinafter described, and the novel features thereof defined by the appended claims.

In the drawings:

Figure 1 is a view of an electric heater constructed in accordance with my invention, the lefthand portion thereof being shown in front elevation, and the righthand portion in vertical section;

Figure 2 is a vertical sectional view, taken approximately on the line 2—2 of Figure 1;

Figure 3 is a horizontal sectional view, taken approximately on the line 3—3 of Figure 1;

Figure 4 is a bottom plan view of the heater;

Figure 5 is an enlarged fragmentary detail sectional view of one corner of the reflector and heating element unit, and particularly illustrating the novel yieldable mounting for the heating element according to one of the principal features of the invention;

Figure 6 is an enlarged fragmentary view in elevation of the metal reflector, illustrating its special corrugated construction; and Figure 7 is a sectional view, taken on the line 7—7 of Figure 6.

Like reference characters designate corresponding parts in the several figures of the drawings, wherein 1 denotes generally the outer casing or shell of the heater, which is preferably constructed of sheet metal and includes a back wall 2, opposite end walls 3, 3, a front wall 4, and a curved or rounded top wall 5. The front wall 4 is provided with vertically spaced elongated openings 6, forming a grill-like structure. The lower edges of the walls 2, 3 and 4 are preferably turned inwardly, providing flanges 7, to which are secured, as by welding, the base members 8, 8, the latter being also preferably of sheet metal construction of channel-like form disposed edgewise beneath the opposite ends of the casing 1 and extending only a short distance inwardly from the ends at the front and back of the casing, as best seen in Figures 1 and 2. Each of the base members 8 is provided with a vertically disposed flange 9 at each of its opposite ends, the flanges being arranged in opposed relation to each other and transversely beneath the casing 1 at the front and rear respectively of the latter. As will be obvious, the base members or legs 8 serve to support the casing at a substantial distance above the floor or other surface upon which the heater may be placed in the use thereof.

At the top of the casing 1, there is provided a bail-like handle 10, having its opposite arms 11, 11 each received loosely through the curved top wall 5 so as to be slidable from an inwardly retracted position illustrated in broken lines in Figure 2, to an outwardly projected heater-carrying position as illustrated in full lines in Figures 1 and 2. The lower ends of the arms 11, 11 are each laterally offset, as at 12, to engage beneath the top wall 5 of the casing and support the weight of the heater when carried by the handle 10.

Attached to the casing 1 is a guard member 13 of generally U-shaped form to provide a front bar 14 disposed in forwardly spaced relation to the front of the heater casing, as shown in Figures 2 and 4. The opposite ends of the guard are bent rearwardly at substantially right angles to the bar 14, thereby providing attaching arms 15, 15 which are secured to the respective side walls 3, 3 in any suitable manner, such as by means of the screw fastenings 16. As will be obvious, the guard 13 serves to prevent the heater from being placed too close to an adjacent object, thereby reducing the fire hazard and promoting safety of operation.

In the curved top wall of the casing 1, a portion of the wall is struck out, as at 17, and depressed within the casing to provide an elongated opening 18. Secured to the under side of the member 17, as by spot-welding, is a plate 19 having its forward edge bent downwardly at an angle, as at 20, for cooperation with the reflector unit, which will now be described.

The reflector unit, generally designated 21, is preferably made of relatively thin sheet metal having a highly polished or chrome-plated surface, and includes a pair of vertically disposed laterally spaced side walls 22, 22 having their forward edges disposed substantially vertically and their rear edges curved, as will be best understood from reference to Figure 2. The edges of each of the side walls 22 are laterally flanged, as at 23, the flanges extending substantially completely around each wall, excepting for a short distance at the bottom. Attached to the side walls, as by welding to the flanges 23, is a curved rear wall 24 which overlaps the flanges 23 from the upper end of the same down to a point, designated 25, near the lower forward end at about the level of the bottom of the first opening 6 in the front wall of the casing 1. At this point, the wall 24 is narrowed in width so that the lower end of the wall may be curved upwardly and rearwardly, as at 26, between the side walls 22, as shown clearly in Figure 2. The free extremity of the rearwardly curved part 26 is preferably flanged at 27, so as to reinforce or strengthen the edge of the wall. The walls 22, 22 and 24 form a hollow chamber, closed on all sides excepting at the front thereof, the chamber, designated 28, being substantially smaller than the casing 1 and having its side and rear walls spaced from the side and rear walls of the casing to define an air chamber 29 at the rear of the reflector unit, and additional air chambers 30, 30, one at each side of the reflector unit. The side air chambers 30, 30 are in open communication at their rear ends with the rear air chambers 29.

The reflector shell 21 is supported upon a base plate 31 by means of vertically disposed standards 32, 32 welded at their lower extremities to the downwardly bent flanges 33, 33 on the opposite ends of the base plate 31, the upper ends of the standards 32, 32 being secured to the outside of the respective side walls 22, 22 of the reflector shell. As previously mentioned, the lateral flanges 23 on the side walls 22 are cut away, together with a portion of the wall 24 at the bottom of the reflector shell, forming an elongated slot 34 of substantial size, thus permitting convenient attachment of the standards 32 to the side walls of the reflector shell, as described above, and also providing an air passage through the bottom of the reflector shell. Disposed intermediate the lower end of the reflector unit 21 and the base plate 31, is a baffle plate 35 which is arranged substantially horizontally with its forward and rearward edges respectively turned upwardly, as at 36. The baffle 35 is preferably attached to the standards 32, 32 by means of a depending flange 37 at each end of the plate 35, each flange 37 being extended at its forward and rearward ends so as to enable the same to be bent around the standards 32 to closely embrace the same, as shown at 38 in Figures 2 and 5.

Mounted within the lower end of the reflector shell 21 is an electrical heating unit, generally designated 39, the same being of any suitable type commonly used for heaters of this kind, and usually comprising a resistor element wound upon a burnt clay or refractory tube. The heating element 39 is preferably disposed horizontally, and in my improved heater construction, it is yieldably mounted between the side walls 22, 22 of the reflector shell 21 to protect the heater element against damage caused by shocks in dropping or roughly handling the heater. To this end, I provide a plate 40, spot-welded at its lower end 41 to the inner side of each of the standards 32, 32, the upper portion of each plate 40 passing upwardly into the reflector shell 21 at the inner side of the respective side walls 22, 22, as clearly shown in Figure 5. The length of the heating element 39 is such as to fit tightly between the plates 40, 40 at the respective opposite sides of the reflector shell 21, and the upper extremity of each plate 40 is laterally offset in an outward direction, as at 42, to firmly engage the respective side walls 22, 22 of the reflector shell, whereby to clamp the heating element 39 by the application of pressure against the opposite ends of the heating element. Due to the fact that the side walls 22 of the reflector shell are relatively flexible, and will yield or spring because of their inherent resiliency, there is thus provided a yieldable or cushioned mounting for the heating element 39. Moreover, the construction just described has the advantage of simplicity and economy of assemblage owing to the absence of any screws or similar fastening devices in the mounting for the electrical element, and permitting convenient removal and replacement of the heating element should this be required.

The opposite ends of the electrical element 39 are electrically connected to a pair of terminals 43 carried by a bracket 44 mounted on the upper side of the base plate 31, the connection being effected by means of conductor leads 45 passing through insulating eyes 46 provided in the rear wall 24 of the reflector shell near the lower end thereof. The terminals 43 are electrically connected with a conductor cord 47 extending through an insulating thimble 48 in the base plate 31, the cord 47 leading rearwardly from the bottom of the heater between the base members or legs 8, 8, as best shown in Figure 2.

It will be understood from the foregoing that the reflector shell 21, heating element 39 and its associated terminals 43, baffle 35, and base plate 31, are all assembled together into a unitary assemblage which may be conveniently mounted within and removed from the outer casing or shell 1 through the bottom of the latter. To secure the unit just described within the casing or shell 1, the unit is introduced into the bottom of the casing to bring the rearwardly turned flange 49, formed at the upper edge of the rear wall 24 of the reflector shell 21, into interlocking engagement with the forward edge of the inclined portion 20 of the plate 19, as best shown in Figure 2. This interlocking engagement of the flange 49 serves to position the reflector shell unit in forwardly spaced relation to the rear wall of the outer casing or shell 1 and at the proper elevation within the casing. When the unit is so positioned, a pair of straps or bars 50, 50 is positioned beneath the base plate 31, with one bar near each of the opposite ends of the base plate, as clearly shown in Figure 4. These retainer bars 50, 50 are each extended forwardly and rearwardly for engagement with the upper sides of the inwardly turned flanges 7, 7 at the lower ends of the respective front and rear walls 4 and 2 of the casing 1. A screw fastening member 51, passing through each of the retainer bars 50 and into threaded engagement with the base plate 31, serves to maintain the assembled relation of the reflector and heating unit within the casing 1.

Each of the retainer bars 50 is preferably offset, as at 52, near its opposite ends, so as to abut against the flanges 9, 9 on the respective base members or legs 8, 8 at the bottom of the casing 1, thereby positioning the reflector and heating unit in proper spaced relation to the side walls 3, 3 of the casing 1, as hereinbefore described. Removal of the reflector and heating unit from the casing 1 is conveniently effected by removing the two screw fastenings 51, 51 and thereafter disengaging the two retainer bars 50, 50 from the flanges 7, 7, in an obvious manner, thus permitting the unit to be withdrawn through the bottom of the casing 1 after disengagement of the flange 49 from the forward inclined edge 20 of the plate 19.

In the operation of the heater, a strong flow of cool air is caused to flow upwardly into the bottom of the casing 1 around the base plate 31 of the reflector and heating unit, and through the apertures 53 formed in the base plate 31 to facilitate the free circulation of the air. As the cool air enters the lower end of the casing, a substantial portion thereof passes around the baffle plate 35 through the slot 34 into the lower end of the reflector shell and directly over the heating element 39. This air is then heated by the heating element and caused to be reflected from the walls of the reflector shell through the openings 6 in the front wall of the casing. The remainder of the cool air entering the lower end of the casing 1 passes into the lower ends of the air chamber 29 in back of the reflector shell, and also into the lower ends of the side air chambers 30, 30 at the opposite sides of the reflector shell, the air becoming effectively heated by contact with the walls of the reflector shell and rising to the top of the chambers, from which the air is allowed to pass through the opening 18 in the top wall of the casing. In Figure 2 of the drawings, the general circulation of the air has been shown by arrows representing the two primary paths of flow interiorly and exteriorly of the reflecting chamber, respectively. Maximum flow of the air is effected by reason of the air entering the heater at the bottom thereof, the flow being sustained by convection resulting from direct contact of the air with the heating element 39 and with the heated walls of the reflecting shell.

In addition to the heat produced by the air circulation, considerable heat is derived from radiation and from direct reflection, as will be readily apparent to those versed in the laws of physics.

The efficiency of the heater is further improved by the provision of means for effectively diffusing the heat, and thus preventing the concentration of heat near the front of the heater. This diffusion is preferably effected by corrugating the walls of the reflector shell as shown in the drawings, and particularly in Figures 6 and 7 thereof. The corrugations are preferably made in the form of intersecting grooves 54 of relatively shallow depth, providing a multiplicity of raised, diamond-shaped surfaces 55, which may be characterized as embossed areas on the reflecting walls. I have found that this construction affords a very effective and uniform diffusion of the heat in all directions, and also diffusion of light rays emanating from the heating element 39, in the case where the same is of the incandescent type. The light ray diffusion feature is quite pleasing to the eye and creates a strong appeal to those who desire an electric heater which simulates an open flame.

By reason of the disposition of the baffle plate 35 below the air slot 34 in the bottom of the reflecting shell beneath the heating element 39, the heat rays cannot pass directly down through the bottom of the casing 1, thus preventing overheating of the surface on which the heater may be supported, or injury to floor coverings or wax finishes. Moreover, the outer casing 1 of the heater, when constructed in accordance with my invention, is maintained comparatively cool, thereby minimizing the danger of possible burns by inadvertent contact with the heater or in moving the heater from one place to another while the heater is in operation. The substantially all-welded construction of the heater is likewise an important advantage, and particularly since spot-welding can be availed of with considerable saving of time, labor and materials.

The disposition of the two openings at the top of the heater and the association of the curved wall of the reflector unit extending upwardly and forwardly to a position intermediate the two openings provide means for discharging the heated air from both of the compartments within the casing in intercepting paths. By reference to Figure 2 it will be observed that the air entering the slot in the lower part of the reflector unit and being heated by the resistance element passes upwardly along the outer surface of the curved reflector shell wall. This wall is so disposed with relation to the second opening from the top of the heater that the air will be directed through that opening in an outward and somewhat upward direction. The air passing into the casing behind the reflector unit is heated by the hot reflector wall and as it reaches the top of the casing the curved upper wall directs the air forwardly through the uppermost opening and at an angle intersecting the air passing through the first mentioned opening. The two currents of heated air intermingling just beyond the two upper openings provide a very efficient means for diffusing the air and thus increasing the efficiency of the heater.

While the details of my invention have been herein shown and described, the invention is not confined thereto, as changes and alterations may be made without departing from the spirit thereof as defined by the appended claims.

Having thus described my invention, what I claim as new and desire to secure by Letters Patent is:

1. A heater of the class described, comprising a reflector shell having laterally spaced vertical side walls provided with laterally extending marginal flanges, a curved wall member extending therebetween from the upper ends thereof down the back to about the bottom of the side walls, and another wall member extending from a point near the bottom of the side walls and forwardly spaced from the bottom of the back wall member and thence curved upwardly and rearwardly between the side walls with its side edges in juxtaposition therewith and with its upper edge terminating a relatively short distance above the bottom of the side walls and rearwardly of the front edges of the latter, said curved wall members being secured to the marginal flanges of the side walls to about the point where the second wall member is curved rearwardly between the side walls, a heating element disposed above the bottoms of the curved wall members and between the side walls and below the upper edge of the second-mentioned curved wall member, and the space between the wall members at the bottoms thereof forming an air inlet below the heating element.

2. A device as claimed in claim 1, in combination with a supporting base member disposed below and in spaced relation to the wall members, vertical standards extending upwardly at opposite sides of the base member and operatively connected thereto and to the outer sides of the respective side walls of the shell, said heating element including a tubular support disposed substantially horizontally and having its opposite ends arranged adjacent to the side walls, and each standard aforesaid having a plate secured thereto and extending upwardly at the inner side of its side wall intermediate the latter and the end of the tubular support of the heating element, with its upper extremity bent laterally into yieldable engagement with the contiguous side wall whereby to impart an endwise clamping pressure upon the tubular supporting member.

3. A heater of the class described, comprising a casing, a reflector and heater unit mounted within the casing and having a base disposed across the bottom of the casing in spaced relation to the latter and having means for effecting interlocking engagement with the casing at its upper end, said casing being open at its bottom and provided with opposed lateral flanges at its lower end extending inwardly toward and terminating short of the base aforesaid, and spaced retainer bars removably positioned beneath the base and extended across the bottom of the casing, with their opposite extremities operatively engaged with the flanges aforesaid so as to support the reflector and heater unit.

4. A heater of the class described, comprising an outer casing, a reflector shell mounted within the casing and dividing the same into separate chambers at the front and back thereof, said outer casing having an air-inlet opening provided therein below the reflector shell and also having air-outlet openings provided therein and communicating with the chambers at the front and back of the reflector shell, said reflector shell including laterally-spaced, vertical side walls arranged in spaced relation to the outer casing and a curved wall interconnecting said side walls and extending at the rear thereof from a point near the upper, forward end of the casing, down the back and across the bottom of the side walls towards the front of the casing near the lower end of the latter, said curved wall being provided with an interruption near the bottom thereof to form an air passage communicating with the air-inlet opening in the bottom of the casing, and being extended upwardly and rearwardly between the side walls at the front of the reflector shell in close proximity to and spaced above the interruption aforesaid, with the marginal edges of the extended portion of the curved wall disposed contiguous to the inner sides of the reflector side walls, and the upper edge of the extended portion being disposed rearwardly of the front edges of the side walls, and a heater member mounted within the reflector shell at the bottom thereof above said interruption and adjacent to the extension of the curved wall, and below the upper edge of said extension.

5. A heater of the class described, comprising a shell including laterally-spaced, vertical side walls and an interconnecting wall extending therebetween from the upper ends thereof downwardly at the back to the front of the lower edge of the side walls with an interruption provided in said interconnecting wall at the bottom of the shell, a supporting base member disposed below and spaced from the walls aforesaid, a pair of vertical standards extending upwardly from opposite sides of the base member and secured to the outer sides of the respective side walls aforesaid, a plate secured to the inner side of each standard and extending upwardly through the interruption in said interconnecting wall at the inside of the corresponding side wall, with the upper extremity of the plate free to move towards and away from the side wall, the upper extremity of said plate being bent laterally towards the contiguous side wall for yieldable engagement therewith, and a heating element disposed horizontally between the side walls and supported at its opposite ends by the respective plates aforesaid and yieldably clamped therebetween with an endwise pressure exerted thereon by the plates and side walls of the shell.

GEORGE STEINGRUBER.